US012629864B2

(12) United States Patent
Hutchinson et al.

(10) Patent No.: US 12,629,864 B2
(45) Date of Patent: May 19, 2026

(54) SPLITTING APPARATUS

(71) Applicant: Vaughan John Hutchinson, Taranaki (NZ)

(72) Inventors: Ayla Hutchinson, Taranaki (NZ); Vaughan John Hutchinson, Taranaki (NZ)

(73) Assignee: Vaughan John Hutchinson, Taranaki (NZ)

(*) Notice: Subject to any disclaimer, the term of this patent is extended or adjusted under 35 U.S.C. 154(b) by 0 days.

(21) Appl. No.: 19/204,394

(22) Filed: May 9, 2025

(65) Prior Publication Data

US 2025/0262790 A1 Aug. 21, 2025

Related U.S. Application Data

(60) Continuation of application No. 18/322,821, filed on May 24, 2023, now Pat. No. 12,318,960, which is a (Continued)

(30) Foreign Application Priority Data

Dec. 21, 2012 (NZ) ........................................ 605133
Jul. 24, 2013 (NZ) ........................................ 613551

(51) Int. Cl.
*B27L 7/08* (2006.01)
*B26D 1/02* (2006.01)
(Continued)

(52) U.S. Cl.
CPC .................. *B27L 7/08* (2013.01); *B26D 1/02* (2013.01); *B26D 7/22* (2013.01); *B27G 21/00* (2013.01); *B27L 7/06* (2013.01)

(58) Field of Classification Search
CPC .... B27L 7/08; B27L 7/06; B26D 7/22; B26D 1/02; B26D 7/0006; B27G 21/00;
(Continued)

(56) References Cited

U.S. PATENT DOCUMENTS 2,509,190 A * 5/1950 Langley ................. B26D 3/185 99/545
3,862,651 A * 1/1975 Heikkinen ................ B27L 7/00 144/194

(Continued)

FOREIGN PATENT DOCUMENTS

DE 507680 C 9/1930
DE 20-2004-017096 U1 3/2005

(Continued)

OTHER PUBLICATIONS

Decision to Grant issued on Jun. 6, 2024 in European Patent Application No. 22176803.9 (2 pages).

*Primary Examiner* — Ghassem Alie
(74) *Attorney, Agent, or Firm* — Gallium Law; Jacob Panangat; Michael Bakke

(57) ABSTRACT

An apparatus for mechanically splitting materials has a body with a cutting element arranged relative thereto. The cutting element has at least one cutting surface oriented vertically. The splitting apparatus has the cutting element applying an upward pressure against the material which is split when a separate downward force is applied to the material. The body of the splitting apparatus also has a safety element to protect the user from the cutting element; an elongate supporting element to distance the safety element from either or both the cutting element and a surface on which the splitting apparatus is used; a stabilizing element to stabilize the splitting apparatus relative to a surface on which the splitting apparatus is used; and optionally a deflecting element to deflect split materials away from the cutting element and container element to contain therewithin split materials produced during the splitting.

11 Claims, 7 Drawing Sheets

Related U.S. Application Data continuation of application No. 16/949,893, filed on Nov. 19, 2020, now Pat. No. 11,701,792, which is a division of application No. 14/653,302, filed as application No. PCT/NZ2013/000239 on Dec. 19, 2013, now Pat. No. 10,906,202.

(51) Int. Cl.

| | |
|---|---|
| ***B26D 7/22*** | (2006.01) |
| ***B27G 21/00*** | (2006.01) |
| ***B27L 7/06*** | (2006.01) |

(58) Field of Classification Search

CPC ...... B27G 23/00; B23D 47/025; B27B 27/02; B27B 27/10; B27B 9/04; Y10T 83/727; Y10T 83/8878; Y10T 29/49902; Y10T 403/4662; Y10T 403/4661; Y10T 403/4665; Y10T 403/4668; Y10T 403/4674; Y10T 403/4677; B23Q 9/0042

USPC .................. 225/81, 103–105; 30/180, 272.1; 83/397, 544, 605, 606, 607, 609, 673, 83/675, 543, 745, 829, 574, 441.1, 821; 144/195.1, 195.2, 195.4, 195.5, 193.1, 144/195.7

See application file for complete search history.

(56) References Cited

U.S. PATENT DOCUMENTS

| | | | | | |
|---|---|---|---|---|---|
| 4,102,373 | A * | 7/1978 | Winiasz | B27L 7/00 | 144/195.1 |
| 4,334,562 | A * | 6/1982 | Granlund | B27L 7/00 | 144/195.1 |
| 4,378,037 | A | 3/1983 | Conn | | |
| 4,782,867 | A * | 11/1988 | Forsyth | B27L 7/00 | 144/195.2 |
| 6,546,976 | B1 * | 4/2003 | Hill | B27L 7/00 | 144/195.1 |
| 6,637,713 | B1 * | 10/2003 | Kleve | F24B 1/193 | 126/540 |
| 7,096,901 | B2 * | 8/2006 | Brazzola | B27L 7/06 | 144/195.4 |
| 2005/0016629 | A1 | 1/2005 | Brazzola | | |
| 2008/0073361 | A1 | 3/2008 | Brouard | | |
| 2013/0327443 | A1 * | 12/2013 | Paden | B27L 7/00 | 144/195.6 |

FOREIGN PATENT DOCUMENTS

| | | | |
|---|---|---|---|
| DE | 10-2008-016470 | A1 | 10/2009 |
| GB | 258069 | | 9/1926 |
| JP | 2004-305256 | A | 11/2004 |
| SE | 538510 | C2 | 5/2014 |

* cited by examiner (Related Art)

SPLITTING APPARATUS

CROSS REFERENCE TO RELATED APPLICATIONS

This application is a Continuation of application Ser. No. 18/322,821, filed on May 24, 2023, which is Continuation of application Ser. No. 16/949,893, filed on Nov. 19, 2020, which is a Divisional of application Ser. No. 14/653,302, filed on Jun. 18, 2015, which is the National Phase under 35 U.S.C. § 371 of International Application No. PCT/NZ2013/000239, filed on Dec. 19, 2013, which claims the benefit under 35 U.S.C. § 119(a) to Patent Application Nos. 605133, filed in New Zealand on Dec. 21, 2012 and 613551, filed in New Zealand on Jul. 24, 2013, all of which are hereby expressly incorporated by reference into the present application.

TECHNICAL FIELD

This invention relates to improvements in and relating to apparatus for mechanically splitting materials and to the method of manufacturing and using the apparatus.

Particularly, the invention relates to a means for splitting wood to produce kindling. The apparatus enables wood to be split with substantially reduced force. The apparatus and method of using the apparatus substantially improves the ability to safely and effectively split the wood.

It is envisaged the invention will be applicable to any situation, for example agricultural, horticultural, forestry, commercial, industrial or domestic situations where material is required to be split to smaller pieces.

However, while the present description relates primarily to splitting wood to produce kindling for use in establishing a fire, the invention may have applications outside this field and the apparatus may be adapted for splitting materials for other purposes. For example, a food quality version may be manufactured and used for breaking/splitting blocks of hard materials, such as candy/toffee, or chocolate. The apparatus may also be used for breaking/splitting blocks of ice; and so forth.

BACKGROUND ART

It is well known that systems exist for breaking or splitting materials.

Where the material is wood the systems used for cutting/splitting are an axe, maul or tomahawk, large motor or electric driven hydraulic/pneumatic wood splitters or such industrial machines.

The problems with axes, mauls and tomahawks are that such tools are dangerous to use, particularly if used by inexperienced people. There is a high risk of misplacing the blow.

A misplaced blow or an over-swing of the tool may result in the axe/maul head hitting the person instead of the wood, resulting in direct injury to the person and potentially resulting in loss of life and/or limbs.

In addition, the impact of the axe/maul head against the wood may cause the head to bounce off the wood via a ricochet or recoil action, which could injure the user. In addition, when the wood is green, or wet, the ability to effectively cut it with an axe, maul or tomahawk is substantially reduced. The head may become imbedded in the wood and the moisture and suction created may make the head hard to extricate from the wood. A reasonable level of fitness is required to cut wood with an axe, maul or tomahawk. It is typically also recommended that such tools are not used by the young, elderly or by people with medical conditions requiring them to avoid stressful and energetic activities.

With motor or electric driven hydraulic/pneumatic splitting systems, particularly the hand-operated ones, a great deal of force in a downward direction is typically required to be applied so that the machine splitting head embeds in to the wood, in order to split the wood.

This increases the danger of wood moving in any direction at considerable speed which can cause injury. Also, the physical force required can again be either unachievable for someone not strong enough or cause injury due to the strain required to create enough force to split the wood.

Further, motor or electric driven pneumatic/hydraulic splitters are large bulky machines and are not generally affordable for many people. They are not suitable for daily use due to their size and cost. Such machines also consist of many moving parts that can break down and require maintenance, which increases the cost of operation. In addition, the risk of injury is greater due to the power the motorised parts produce and operate at.

Where other materials are required to be split up, such as harder food materials (candy/chocolate for example), or ice, typically mallets are used; or in some cases and with some materials, augers may be used. The pressure applied may fracture the material, but the material may fly out from the point of impact. In addition, too much pressure can crush the material into very fine fragments and too little can result in large chunks.

While the present invention has a number of potentially realisable applications, it is in relation to problems associated with existing wood splitting systems and the methods of manufacturing them, that the present invention was developed.

Further, it was with regard to the issues of providing a method of splitting materials, such as wood, confectionery, ice, and so forth in a way, and via the use of a machine adapted to address multiple issues that the present apparatus and method were invented.

It was also developed with safety and health issues typically associated with such systems, that the present invention was developed.

Finally, it was having regard to the need to provide a system that could be applied to other materials, that the present invention was developed. It would be useful therefore, to have a process for manufacturing a means for splitting/cutting up materials that:

1. Would be cost effective;
2. Would be small for indoor or outdoor use; and
3. Would be compact for indoor or outdoor use; and
4. Would be easily moved from one location to another; and
5. Would require minimal force to split the wood and/or other materials; and
6. Would enable fit, elderly, infirmed (such as with arthritis) and the young to all use the apparatus to split the wood and/or other materials; and
7. Would give many people back an independence that they may have lost and/or also provide the ability to share in this task; and
8. Would be faster to use than any other existing system, particularly for home use; and 10. Would be safer to use than any other existing system available, particularly for home use; and 9. Would require minimal maintenance, such as simply sharpening, or replacing the cutting means, just as would be required for an axe, etc; and 11. Would be able to be made in a variety of ways to suit many different styles and tastes.
12. Could be adapted to be used for other materials, in a range of applications.

It would therefore be advantageous to have an invention that offered at least some, if not all, of the potential advantages of the above proposed cutting means for splitting wood and/or other materials. It is therefore an object of the present invention to consider the above problems and provide at least one solution which addresses a plurality of these problems.

It is another object of the present invention to at least provide the public with a useful choice or alternative system. Further aspects and advantages of the present invention will become apparent from the ensuing description which is given by way of example only.

It should be appreciated that variations to the described embodiments are possible and would fall within the scope of the present invention. It is a therefore, a further object of the present invention that whilst the cutting apparatus is described with reference to splitting wood to produce kindling, the cutting apparatus may also relevant for use in a number of other applications where coarse or fine splitting of material is required.

Disclosure of Invention

The present invention is directed to improved splitting apparatus for use with splitting materials. The present invention is further directed to the use of the apparatus for splitting wood to produce kindling in coarse or fine form; and/or be adapted for use with other materials, including confectionery, ice, and so forth.

According to one aspect of the present invention, there is provided splitting apparatus for use with splitting materials, said splitting apparatus including a body, said body including safety means to protect the user from injury, supporting means to either or both attach and support one feature of the splitting apparatus relative to another, and cutting means adapted to effect splitting of the materials.

According to another aspect of the present invention substantially as described above, the supporting apparatus are substantially elongate to distance the protective means from either or both the cutting means and surface on which the splitting apparatus is used.

According to another aspect of the present invention substantially as described above, the body of the splitting apparatus optionally also includes a base.

According to another aspect of the present invention substantially as described above, either or both the base and the supporting apparatus are adapted to stabilise the splitting apparatus relative to a surface on which the splitting apparatus is used.

According to another aspect of the present invention substantially as described above, the splitting apparatus is adapted to also optionally include stabilising means-dedicated to stabilise the splitting apparatus relative to a surface on which the splitting apparatus is used.

According to another aspect of the present invention, the cutting means is adapted to be attached to at least one or more of, the supporting apparatus; the base; structural features depending from the protective means to locate the cutting means at a predetermined height from the protective means and/or the surface on which the splitting apparatus is used.

According to another aspect of the present invention, substantially as described above, the splitting apparatus optionally includes deflecting means to deflect the split material away from the cutting means, to keep the cutting means clear of material.

According to another aspect of the present invention, substantially as described above, the splitting apparatus optionally is either or both assembled from a kit set and manufactured as an intact unit.

According to another aspect of the present invention, substantially as described above, the splitting apparatus is optionally collapsible for storage, transport, manufacturing purposes.

According to another aspect of the present invention, substantially as described above, the cutting means is adapted to be permanently or removably secured to the splitting apparatus. For the purpose of the present invention, the term "splitting apparatus", shall mean and include any apparatus adapted to cutting/splitting, crushing or fragmenting any material such as wood, food products (frozen or not), stone/rock or clay, plant matter or plastics. It should therefore be appreciated that the term splitting apparatus is not intended to limit the scope of the present invention.

The main principle behind this invention is that manually, when a maul or axe are used, the maul head or axe head is typically struck onto/into a flush-cut section of log. The log or piece of wood is usually standing on end on top of a splitting stump or other suitable base. Splitting is achieved by the downward chop of the maul or axe, splitting the wood apart along its grain. The swing downwards relies on the force of the swing, the weight of the axe/maul head and gravity to drive the cutting means into the wood end. Even when a wedge and a hammer is used, the force is applied downwards by the hammer onto the wedge (cutting means) to drive the wedge downwards into the wood.

The cutting means (axe/maul) is required to have a handle for levering and swinging of the cutting means towards the wood. No handle is required for the cutting means of the present invention.

In mechanical systems, motorised or electric, driven by gas, diesel, petrol, electricity and offering pneumatic/hydraulic splitting systems, the same arrangement is used. The force is applied downwards by the pressure means against the cutting means which is forced in to the wood. Some systems may be arranged horizontally, but the same process applies.

A typical splitting wedge is used with its length oriented vertically into the material to be split. A downward force applied to the top of the wedge produces forces perpendicular to its inclined surfaces.

The present invention achieves the same outcome but in a different way. The cutting means is fixed—it does not move and it is not part of the pressure means.

Separate pressure means are used. In the present invention, the material moves downwards and the cutting means action is upwards into the wood.

The benefits are that there are no requirements to apply so much force via the present invention as the user is not driving the cutting means into the wood from above. It only requires a mallet, which reduces the weight to be handled and of the need for as much force by the user.

Maul heads or axe heads can become stuck wooden logs for a number of reasons—the wood not being struck with adequate force, the wood including knots, or the length of wood being too long. With a maul/axe the cutting means when imbedded into the wood has to be pulled out—or the wood and the axe/maul swung together to try to break through the wood. At that point the wood is forced against the surface as part of the swing. It makes the swing harder and heavier and there is a risk that the wood may fly off the axe/maul head and hit the user. With the present invention, there is none of this. There is a continued easy ability to hit the wood from above and onto the cutting means, until the cutting means splits the wood.

Further, there is no problem of any axe handles or maul handles breaking—as the handles are no longer applicable.

Wedges are typically pushed through along the wood grain and not across-grain as can be achieved with an axe. However, the present invention can achieve both along the grain and across the grain splitting.

Unlike with the use of mauls or axes, longer logs may require the strike be off-centred to avoid the maul or axe head becoming stuck in the wood, the present invention avoids this issue, even though the cutting means engages the centre of the material.

It is also common for the wedge/axe/maul head to chip itself. This can be dangerous as flying chips of steel could damage the eye. This is minimised where the cutting means is stationary and the wood/material is driven onto it.

A typical maul for wood splitting will have a head weighing in region of 4 kg—this is weight that the present invention does not require the user to lift/swing. Plus the previously mentioned advantages of the cutting means being fixed/not moving minimises potential accidental injuries from the cutting means hitting the body-even a widened stance may still leave the splitter's feet vulnerable, or the axe head falling off and hitting the user, and so forth.

Yet a further benefit is that harder, seasoned logs which have dried sufficiently, often split apart with enough force that each half tumbles away at some speed, which is a hazard for people or objects nearby. The present invention includes safety means that minimise wood movement, making the process easier and safer.

With mechanical log splitters, the cutting means are separate from the pressure means. However, many log splitters are rated by the tons of force they can generate. This may range between 10-25 tons of force, depending on the size of the machine and whether it is for home or industrial/commercial use. The higher the pressure rating, the greater the thickness or length of the wooden logs or rounds that can be split. The present invention does not require the application of such substantial force, nor the need for separate electrical or motorised power means.

A simple log splitter may be powered by an electric motor driving a hydraulic/pnuematic pump or by gasoline or diesel engine with or without a tractor.

A hydraulic piston is typically used to drive a log through a stationary blade; or, a rotating cone shaped screw mandrel pulls the log up over a wedge. While here the log moves relative to the cutting means it requires a motorised system to achieve this. The present invention does not require fuel, electricity, large machines or moving parts—all of which are prone to failure.

Although a good log splitter can save the user hours of labour, it is not possible to make it completely safe—due to the tons of pressure applied. There is a risk of injury from flying splinters of wood. The present invention does not require the same force to be applied. So, the risk of flying splinters at high speed is minimised. Nevertheless, the option of including the receptacle with the present invention provides a means to contain any split or splintered wood so that it does not fly out and hit the user.

The present invention requires no moving parts or motors, does not require any power, fuel to run, it is compact in size yet could be made on a larger scale and splits/cuts the material in a safe and easy manner. This is achieved by having a stable cutting means that is supported in a secure position by the body of the splitting apparatus so that there is no risk of movement or instability when cutting/splitting occurs. Safety means protects the user from cutting themselves on the cutting means by preventing any body part from coming in contact with the cutting means when moving in a downward action, the safety means is supported by the supporting means.

When the material, say wood, is placed down the centre of the safety means (ring) to rest on of of the cutting means, it is partially supported by the safety means allowing the user to ensure their hands are away from the cutting means, hence avoiding the risk of being injured. The user then uses any pressure means, such as with a mallet, hammer, stone/rock, or wood, to tap on top of the material (to be split) in a downwards action while ensuring the material is resting on the sharp edge of the cutting means. The process is repeated until the material splits. Then, the smaller pieces of material are also each able to be subjected to the same process until a desired thickness of the material is reached.

The splitting apparatus can be made out of multiple pieces and assembled together, for example the base, supporting means, cutting means and safety ring could be made as separate pieces that are then put together to form the splitting apparatus. It could be assembled using means such as but not limited to locating tabs/points that click/sit into position and secured by bolts/screws, welding and/or adhesive, or the splitting apparatus could be made as a singular unit by either casting and/or molding out of cast iron, plastic or any other suitable material.

In order to function as required in accordance with the present invention, the splitting apparatus includes cutting means.

For the purpose of the present invention, the term "cutting means", shall mean and include any structure adapted to break, burst, rip apart, chip, cut, tear, divide (from end to end, along the grain, or otherwise), the material such that the material is separated into parts, broken into pieces, splintered. In relation to the present invention, the cutting means therefore includes any apparatus that achieves the required function and may include means akin to an axe-head, maul head, chisel, spike, tomahawk, cleaver, adze, chopper, blade and so forth.

The term cutting means shall also include anything that has a blade-like configuration, with at least one compound inclined plane (consisting of two inclined planes placed so that the planes meet at one edge), such that when the edge where the two planes meet is pushed into a solid or fluid substance it overcomes the resistance of materials to separate by transferring the force exerted against the material into two opposing forces normal to the faces of the blade and causes the material to split, fracture, and so forth.

Wedges, axes, mauls and chisels can separate thick and hard materials, such as wood (to separate wood fibres), and including solid stone and hard metals, with much less force, less waste of material, and more precision, than crushing. However, where different materials are used with the present invention there may be a combination of cutting, splitting and crushing forces applied.

The shape of the cutting means may be wedge-shaped, triangular, spike-shaped, knife shaped, and so forth. The width of the cutting head may be adapted to provide optimum cutting/splitting action and minimise the likelihood of becoming stuck in the wood/material.

Depending on the desired cutting action, the cutting means may be configured to be slightly convex (to provide the necessary width) as with a maul; or, may have an elongated "hollow ground" concave-section similar to a cutting axe.

Referring to the above, it is to be noted that the overall shape of the cutting means will have regard to the mechanical advantage of the cutting means that can be calculated by dividing the length of the slope by the cutting mean's width, in accordance with the following equation:

$$MechanicalAdvantage = \frac{\text{Length}}{\text{Width}}$$

The present invention can be placed on any supporting, steady surface and stabilising means may be used to retain it in that location. This means that it is able to be positioned at a height that minimises back fatigue for the user.

It should therefore be appreciated that the term cutting means is not intended to limit the scope of the present invention.

The cutting means is substantially sharp, in order to be able to cut through or into the material being cut/split, or provide a face against which the material fractures. The sharpness of the cutting means is however required to be only as sufficient as needed to effect splitting of the wood. It is therefore, not necessary to have the cutting means sharp in all applications where the downward force is enough to split the material, as a duller edge will achieve the same effect.

The cutting means includes at least one cutting surface. The cutting surface is toward the outer distal edge of the cutting means where the cutting means impacts/contacts the material. The cutting surface may include at least one edge and/or face that is adapted to contact the material. The cutting surface may be tapered along one or more of the at least one edge and/or face. The cutting surface edge or face is able to be sharpened.

The cutting means may be assisted by the inclusion of secondary cutting means such as, but not limited to a lump, bump, wedge or extrusion that is attached securely to the cutting means, the supporting means or body or base by being welded, screwed, riveted, bolted, cast into the design or otherwise attached securely thereto. This is to aid the splitting action by forcing/splaying the split material further apart. The lump, bump, wedge or extrusion could be of any shape or size but would work best if of equal width or wider than the widest part of the first cutting means. It could be configured to any shape such as a wedge shape, fins or solid block and made from any material such as but not limited to metal, rock materials or thermoplastics materials (including reinforced thermoplastics), or any other suitable material.

In other embodiments, the cutting means may have multiple sharpened edges or surfaces, or may include or be associated with multiple cutting surfaces, to provide the ability to apply multiple cutting actions to the material and achieve multiple segments at one time.

Alternatively, the use of multiple cutting surfaces may offer a range of cuts other than the splitting achieved when using a single cutting means. Multiple splits, fragmenting, shattering or crushing may be achieved with multiple cutting surfaces. This will allow the invention to be used from splitting wood through to applications where it can be used for preparation of food, or splitting blocks of ice or other materials.

The cutting means may be adjustable so that it slides/rotates/pivots—so moves to be located into a safe/storage position when not in use, or to adjust the height of the cutting means. In one example, the cutting means may be attached to the supporting means of the body and held in place by a portion of the cutting means fitting into complementarily configured grooves. The cutting means could be moved out of the grooves and/or slide up or down the supporting means.

The cutting means may also rotate. For example, a circular disc may be configured to include cutting means along one portion of the circular edge and a blunt section along another portion of the circular edge. The circular disc may be mounted between the supporting means and/or other features of the body in a secure manner but would have a mechanism that allowed for the disc to be rotated/turned and locked into place so that either side of the disc could be in the upright or exposed position.

In one embodiment of the present invention—where the splitting apparatus is used for splitting wood, the cutting means may be configured to complement the shape of an axe or tomahawk head. Alternatively, the cutting means may take the overall configuration of an axe or tomahawk head, but yet spans the full distance/width between the supporting means. However, in other embodiments, where the splitting apparatus is used with other materials, the cutting means may be similarly or otherwise configured.

Preferably the cutting means is made from metal because of the strength and sharpening qualities that metal provides, as well as offering the ability to clean (sterilize for food quality or medical purposes as may be required with some versions/embodiments of the invention) to achieve preferred hygiene standards. In addition, replacement cutting means may be readily available when or as required.

Any metal/cast iron of suitable hardness and capable of holding a sharpened edge could be used. Steel, as used with existing axe heads, mauls, and tomahawks would be of suitable quality for applications designed for splitting wood. Some examples of existing cutting means able to be used with, or able to be adapted for use with the present invention, include axe heads.

Stainless steel may also be used, but this may be more applicable to embodiments used for food items or medical purposes where it is preferable that the cutting means be capable of being sterilised.

The cutting means could however be made from reinforced thermoplastic materials, if using to cut materials of a softer substance, but it would be more suitable for less permanent applications—such as for use as a throw-away-and-replace nature since such materials may not be able to retain a sharpened edge, or be subsequently re-sharpened.

Where steel is used, such as for versions used for splitting wood, the splitting apparatus may have a protective costing applied—such as through painting or galvanizing the steel—to minimise the potential for the cutting means, and/or other parts of the splitting apparatus also made of steel, to rust.

The splitting apparatus includes a body. The cutting means is attached to the body in a secure manner. In order to operate effectively, the cutting means is required to be rigidly held relative to the body, so that there is no potential for the cutting means to break, or for deflection of the cutting means off the material to be cut/split.

The cutting means is able to be either permanently fixed or removable from the body. If the cutting means is fixed to the body, this may be achieved via welding, or fixing with any suitable adhesive, or via permanently fastened screws/rivets or cast as a complete unit, and so forth.

Where the cutting means is required to be sharpened, either a means is applied to sharpen it in situ, and/or the cutting means is removable for sharpening or replacement (if broken).

In other embodiments, the cutting means may be inserted into or through an aperture in the face of the body and secured via any means suitable. This is an alternative to an option that the cutting means be fitted onto a portion of the body.

The cutting means is preferably connected and/or positioned relative to the centre of the body, but it, or multiple cutting means, could be located elsewhere and fixed differently.

For example, the cutting means may depend from the protecting means and held in a substantially suspended configuration thereby; or, the cutting means may be attached to supporting means; or, the cutting means may be located closer to the protective means, or to the base as may be dictated by the materials to be split and/or the shape of the cutting means; or the cutting mans may be centered relative to the body, or extend across the entire width of the body.

The cutting means may be either fixed permanently or be removable, or be moved to a different location on the invention. Such movement may be effected by, but not limited to, sliding, rotating or pivoting and so forth the cutting means for storage and/or changing of cutting style or cutting means.

The body is substantially adapted at its base to sit flat against a support surface to allow for stability. However, the base of the body may be of any shape, including the provision of 'feet' attached to the base of the body to add stability if the body is not flat, or for decorative purposes. The base may have shock absorbers in the form of springs, rubber cushioning or combinations of any shock absorbing materials available in the prior art—that may assist in absorbing the force of impact when in use.

In some embodiments, the base may extend across the full width of the body. In other embodiments, the base feature may be confined to extended platforms (of variable diameter) uniquely associated with and around each of the supporting means structures. In other embodiments lacking a specifically configured base, the supporting means may be configured as spikes to be inserted into the surface to a depth required to provide stability as required.

Depending on the embodiment and its uses, stabilising means may be included. For the embodiment used for splitting wood, the stabilising means may be steel spikes extending from or through the base and able to be pressed into the ground—to hold the base securely in that location; or where the embodiment is to be used for confectionery/ice, the stablising means may be suction caps for holding the base relative to the surface of a kitchen workbench, and so forth.

One optional configuration for the splitting apparatus and body is circular as it offers an aesthetically pleasing shape. Wood can be cylindrical in shape but wood sections may also be a rectangular shape. From tests, the body configuration was found to have no impact on the working of the invention irrespective of whether cylindrical logs and/or rectangular wooden pieces were tested.

The body is of a thickness designed to provide secure attachment of the cutting means to the body and for strength of the overall invention and/or when the cutting means is fixed elsewhere the thickness is to add stability or be aesthetically pleasing. There is no preferred thickness for the body as long as the body is able to provide a secure structure that has enough weight to prevent imbalance or movement of the invention when it is in use.

Depending on the embodiment and its uses there may be no base, and as mentioned above, the supporting means may instead have feet that provide the stability or, they may be elongated with pointed ends/spikes which achieve the requirements of the base.

In one embodiment, designed more for domestic use, to cut kindling for the fire, an 8 mm steel plate having an outside diameter of 200 mm has been found to provide the desired stability for the size of the cutting, support and safety means and at the most affordable price. These dimensions provide a compact unit, large enough to split manageable pieces of wood into kindling of various sizes. The invention could also be made smaller. However, this would be only substantially applicable to the splitting of smaller pieces of wood which would be suitable for people who have the smaller sized wood burners such as chip-heaters. The invention could also be made on a larger scale to be used in an outdoor situation to assist in the cutting of larger pieces of wood such as tree rings.

Therefore, the body may be dimensioned to any preferred size, provided the size does not impede the operation of the invention. Smaller versions may however, be relevant for use in domestic kitchens for use with food items. Larger versions would also be relevant in the food industry.

The body can be made any suitable material. In embodiments designed for splitting wood the body is preferably made out of metal (steel, stainless steel, other metals) as this provides strength to accommodate the forces required to split wood and stability and weight of the body to ensure that it remains in the correct position—otherwise the splitting apparatus may topple over if the material to be split is too heavy for the body.

The body may otherwise be made from wood/reinforced thermoplastic materials if it is of the correct weight and size to provide stability and depending on the use to which the splitting apparatus is to be applied. The body could be made from wood or plastic as long as it still provides the required stability for the invention during use. If the body is not large enough, or is not heavy enough, the invention could potentially become unstable which could cause it to topple over when being used. This would make it ineffective as the user would have to keep resetting it up and extra care would be needed when using the pressure means to ensure that injury did not occur due to an unstable invention.

Preferably the body is made from metal (steel) because the cutting means can be securely attached by welding. The body could also be covered in a coating of some softer material such as rubber to be aesthetically appealing. The body may also be galvanized, painted, plastic coated, and so forth.

The splitting apparatus also includes supporting means.

For the purpose of the present invention, the term "supporting means", shall mean and include any structure adapted to attach and/or support one feature of the splitting apparatus relative to another. For example, the supporting means is able to attach to and support the safety means relative to the rest of the body/base. The supporting means may also be used to connect and support receptacle/container means around the splitting apparatus and/or as a support for the cutting means.

It should therefore be appreciated that the term supporting means is not intended to limit the scope of the present invention. The supporting means supports safety means of the splitting apparatus but is not limited to this. In some embodiments, the supporting means may be used to attach the cutting means thereto, to suspend the cutting means above and distanced from the base and/or surface on which the splitting apparatus is standing. In addition, as mentioned previously, the supporting means may be configured to include spikes, feet, suction cups to enable the supporting means to also offer stability to the splitting means in embodiments that do not include a dedicated base.

Depending on the configuration of the cutting apparatus there may be multiple supporting means located at set positions, or there may be a single solid supporting means that encircles or extends around the entire body. The supporting means provides substantially rigid support for the safety means to ensure that the safety means does not move or give way under impact or pressure applied to the material during a splitting activity. In addition, the supporting means may serve a cosmetic function, so more may be added if this is visually appealing but does not affect the use/operation of the invention. A single supporting means may be suitable if using a cutting apparatus for a softer material such as a food product where less force may be required to make a cut and unobstructed access to the cutting mean may be required.

However, if using the cutting means to cut wood or stone, at least two supporting means are preferably used to provide adequate support to accommodate the downward force that the safety means may be exposed to. In addition, the supporting means could be used to support the cutting means. The cutting means may be attached in a manner such as resulting from the casting of the features of the splitting apparatus; or, by welding, interconnecting or using substantially permanent adhesive materials and so forth. The attachment is such that the cutting means would be securely fixed/attached to the supporting means during use; but, may be configured to also be removable when not in use. The cutting means is preferably located in a position preferably in the central area of the body, but it could be fixed elsewhere.

The supporting means is located around the periphery of the body, or may be at predetermined locations on or substantially in the interior of the body or on or along the edge of the body. The supporting means are positioned to allow adequate room around the cutting means so that the material being split does not jam between the cutting means and the supporting means. The location must also provide suitable support for the safety means. If using more than a single supporting means the arrangement is best when equally spaced from each other to achieve maximum strength. The supporting means may also be made with spikes or feet on the ends instead of being attached to the base/body.

Depending on the embodiment and its uses there may be no base or horizontally projecting platforms associated with the supporting means. Instead, the supporting means may be additionally elongated with suitably configured ends (as spikes, pronged grips, etc) that could be forced into the ground or a timber log and/or have feet that stabilise the invention.

The invention could also be stabilised by cutting means that spans the width between the supporting means and which, in combination with the rigidity of the safety ring means, would add more stability. The length of the supporting means would have to be such that they would secure the invention in a way that it was stable and secure.

Or, in another embodiment, the cutting means may be located at the base of the supporting means, the bottom edge of the cutting means sits securely inserted into an extrusion/wedge which is fixed to or molded with the base. The supporting means are still supporting the cutting means and safety means but are not attached and fixed directly to the base. This embodiment still allows the apparatus to be used in the same manner as other embodiments.

The supporting means are made out of any suitable material that is strong enough to support the safety means. In one embodiment, the supporting means are made from metal (steel) as this provides the optimum strength to accommodate impact forces from the wood being hit by pressure means which may also be applied to the safety means. The supporting means could also be covered in a coating of some softer material such as rubber, plastic material and so forth, to be aesthetically appealing.

However, the supporting means could be made from other materials, such as reinforced thermoplastic materials and or any combination of various materials, including wood, if this was to provide enough strength and stability to support the safety means particularly when the splitting apparatus is being used for splitting softer materials.

The supporting means are preferably arranged to extend in a plane perpendicular to the base, or body of the splitting apparatus and to separate the body and the cutting means from the safety means by a preferred distance. The distance enables the material to fall free of the surrounding safety means after the material has been split/fractured. This makes it easier to collect the split material from the invention.

The preferred distance is determined such that it is adapted to accommodate the length/thickness of the material, to provide a preferred amount of travel of the material downwards when pressure is applied against the material to force it on to the cutting means, and to prevent injury. As regards the latter requirement if there is not enough distance between the safety means and the cutting means there is an increased risk that the user may be able to make contact with the cutting means if they were to miss with their pressure means or slip or fall onto the invention, or put their hand through the centre of the safety means to retrieve the material they had split. If there is not enough distance between the cutting and safety means they are more likely to get their hand much closer to the cutting means than would otherwise be safe to do. With sufficient distance, the safety means should provide a restriction to the arm which will help prevent contact with the cutting means.

The supporting means may be fixed to the body and the safety means by being welded, screwed/riveted/bayonet-fitted or glued with a appropriate adhesive. They may be removable and of any length desired. When using a base with the body, the supporting means are fixed to the body by being welded, screwed, riveted, bolted/bayonet-fitted or otherwise attached securely thereto. They are attached this way to ensure stability and that they remained in their position and are secure. If they were to come apart from the body while in use there is a higher risk of injury to the user from the cutting means.

When the supporting means are being used with spikes or feet on the bottom these are to be fashioned in a manner that provides sufficient stability that the invention remains in position while in use.

The supporting means may also be configured as, but not limited to, an 'x' configuration with pivotal axis points (hinges) that allow for the splitting apparatus to be collapsible for storage and transportation. The pivoting points would most likely be located at the centre of the 'x' and if required at the points where the base and safety means attach to the supporting means. There would be locking tabs to secure the splitting apparatus in the position to prevent collapse of the invention while in use.

The splitting apparatus also preferably includes safety means. The safety means may be configured to operate also as the supporting means and be appropriately attached to the other components of the splitting apparatus.

Any suitable means for attaching the various component parts of the splitting apparatus together, may be used with, or adapted for use with the invention.

For the purpose of the present invention, the term "safety means", shall mean and include any structure adapted to provide a safety barrier between the user and the cutting means, it should therefore be appreciated that the term safety means is not intended to limit the scope of the present invention.

The safety means is configured to be of a size and shape that helps to minimise the risk of coming into contact with the cutting means. In one embodiment, the safety means has been designed in a ring (circular) shape as this was found to be strong and had no sharp edges to cause injury. It is of a size that allows the material (wood) to fit through with ease, but still small enough to help support the material sitting on top of the cutting edge of the cutting means; but, the safety means could be otherwise configured to be any other shape such as may be required for specific uses.

In some embodiments the shape of the safety means is such that it operates as a guide to direct the material into the appropriate orientation on the cutting means and/or maintains it in an appropriate position without having to steady or hold the material with a hand.

The safety means is located on top of and attached to the supporting means. In one embodiment, the safety means is preferably welded in a fixed position. However, the safety means may be removable if attached with screws, or on a hinge/swivel to pivot from one of the supporting means if this variation was desired. For example, the safety means may be attached by being welded, screwed/riveted or glued with an appropriate adhesive on to, or in the vicinity of the body, the supporting means as these are there to support the safety means.

The safety means is made out of any suitable material, in one embodiment, the safety means is made out of metal (steel) as this provides strength to take the force that it may be impacted with from the pressure means and also to ensure that it remains in the correct position. If it was to move out of position while in use it would not provide protection. Metal is also a cost effective and durable material for use with the splitting apparatus. The safety means may be made from a wood, plastic or rubber if it was strong enough, or reinforced, to provide the protection.

Preferably the safety means is made from metal because this is a strong material that can be fixed securely by welding to the supporting means. Other materials such as plastic or rubber may however provide a cheaper alternative that could be suitable for use when chopping/splitting softer items. The safety means could also be covered in a coating of some softer material such as rubber, thermoplastics material and so forth, to be aesthetically appealing and less abrasive when contacted by the user.

Types of products that require less force to split, means that the safety means may come in contact with less force so less strength is the safety means may be required. The safety means is designed to prevent the user from injuring themselves on the exposed sharpened edge of the cutting means. In addition, the safety means stops the material from easily moving outside of the safety means internal area. Any material that enables the safety means to perform the required function may therefore be used.

Where the splitting apparatus is adapted to be used for confectionery and ice, the entire splitting apparatus may be placed inside a receptacle (container means) configured to accommodate the splitting means and provide a means to prevent the confectionery and/or ice from scattering when split. After the splitting action has occurred, the splitting apparatus may be removed from the receptacle/container and the split confectionery and/or ice is retained in the container and is easily then transferred to another collection point.

The splitting apparatus also includes storage means for use with the cutting means when the cutting apparatus is not in use. For the purpose of the present invention, the term "storage means", shall mean and include any structure adapted to cover and or contain the invention especially the cutting means. It should therefore be appreciated that the term storage means is not intended to limit the scope of the present invention.

The storage means operates as a cover for the sharp surface(s) of the cutting means, to help prevent damage to the cutting surface when the kindling cutter is not in use; or to prevent injury to any person that comes in contact with the cutting surface(s).

The cover can be made out of any material either hard or soft. The cover may be manufactured out of a suitable material such as leather, vinyl or plastic and so forth.

The cover can be manufactured via cutting out of a material and sewing into a preferred shape to complement the splitting apparatus and/or the cutting means. In other embodiments, the storage means may be welded, moulded out of plastic or rubber, metal. The cover needs to be able to fit over at least the sharp edge of the cutting means so that it eliminates the risk of injury while the cover is in place.

In order to split the material, a pressure means is required. The pressure means includes any item or tool, such as a hammer, mallet, sledge hammer, or any other object that can be used to create and apply blunt force to the material within the splitting apparatus. For example, the pressure means may also include another piece of wood or, a rock. The pressure means is applied to the exposed top of the material sticking out of the splitting means and applies downwards force onto the material forcing it onto the sharpened edge of the cutting means. A single blow, or repeated blows, applied to the material result in the material being split, fractured, etc due to the intrusion of the cutting means into the lower edge of the material.

In assembling the splitting apparatus of the present invention, the following steps are followed:

a) From a substantially flat piece of the constructional material, cut out the body/base to the desired shape and size and thickness
b) Determine the cutting means to be used; and
c) Fix the cutting means to the centre of body; and
d) Cut supporting means to a desired length and attach to the base by welding or otherwise affixing; and
e) Prepare the safety means to a preferred size and shape to complement the base, or as may be required to accommodate and/or guide the material to be split within a central aperture provided in the safety means; and
f) Position the safety means on to the upper distal ends of the supporting means and secure in one or more locations; and
g) Attach optional stabilising means and/or container means as required.

An alternative assembly option includes:

a) From a substantially flat piece of the constructional material, cut out the various flat sections of the supporting apparatus to the desired shape and size and thickness. This would include at least one of—safety means, base, stabilising apparatus, supporting apparatus and potentially container means (which may subsequently require bending/forming into preferred shape); and b) Prepare the safety means to a preferred size and shape—whether to complement the base, or as may be required to accommodate and/or guide the material to be split within a central aperture provided in the safety means; and c) Prepare the supporting means to a desired length and determine whether the supporting means is to be attached to a base, to extended stabilising means to project from around the supporting means, or whether the supporting means will be sharpened to include spiked outer distal ends and thus stand-alone; and d) Position the safety means on to the upper distal ends of the supporting means and secure in one or more locations; and e) Determine the cutting means to be used; and f) Fix the cutting means in a position that will be substantially central to the final body; and g) Fix the supporting means to the remaining relevant portions of the body (depending on the embodiment desired), such as a base, stabilising means, and/or cutting means by welding or otherwise affixing; and h) Attach optional stabilising means and/or container means as required.

In using the splitting apparatus, the following steps are followed:

a) Stabilise the splitting apparatus against a surface on which it is to be used; and b) Place material you wish to split (in this case wood) down through the centre of the safety means until it rests on top of the cutting means; and c) Support the wood with one hand so that it is in a substantially vertical arrangement and sits on top of the cutting edge of the cutting means (which would be substantially centred on the base and in turn centered with respect to the safety means); and d) Holding pressure means in the other hand, tap gently but firmly on to the top of the wood forcing the wood downwards on to the cutting means, until the wood splits (using as much force as may be required)

Where the safety means substantially is designed to hold the material in place, the user may not need to further stabilise the material by hand. The stabilising means may also be sufficient to provide the needed stability to the overall apparatus and material, without the user needing to further stabilise the material by hand.

Having regard to the above description, it should be appreciated that the splitting apparatus provides a means for splitting/cutting up materials in a way that can provide potentially realisable advantages, in so far as, the apparatus is adapted to be, or is able to be adapted to be:

1. Cost effective;
2. Small for indoor or outdoor use; and
3. Compact for indoor or outdoor use; and
4. As large as may be required for other uses; and
5. Easily moved from one location to another; and
6. Requiring minimal force to split the wood and/or other materials; and
7. Able to be used by the fit, elderly, infirmed (such as with arthritis) and the young to split wood and/or other materials; and
8. Able to give many people back an independence that they may have lost and/or also provide the ability to share in this task; and
9. Faster to use than any other existing system, particularly for home use; and
10. Safer to use than any other existing system available, particularly for home use; and
11. Require minimal maintenance, such as simply sharpening, or replacing the cutting means, just as would be required for an axe, etc; and
12. Made in a variety of ways to suit many different styles and tastes.
13. Used for other materials, in a range of applications.

It will therefore be appreciated that the invention broadly consists in the parts, elements and features described in this specification, and is deemed to include any equivalents known in the art which, if substituted for the prescribed integers, would not materially alter the substance of the invention.

Variations to the invention may be desirable depending on the applications with which it is to be used. Regard would of course be had to effecting the desired size, useability, cost of the cutting apparatus and so forth, dependent on the requirements of the user—such as how much material is to be cut/used, frequency of use, type of material to be cut (hard/soft), cost requirements, and so forth.

Whilst some varying embodiments of the present invention have been described above and are to be yet exampled, it should further be appreciated different embodiments, uses, and applications of the present invention also exist. Further embodiments of the present invention will now be given by way of example only, to help better describe and define the present invention. However, describing the specified embodiments should not be seen as limiting the scope of this invention.

BRIEF DESCRIPTION OF DRAWINGS

Further aspects of the present invention will become apparent from the following description, given by way of example only and with reference to the accompanying drawings in which.

BEST MODES FOR CARRYING OUT THE INVENTION

Figure 1:
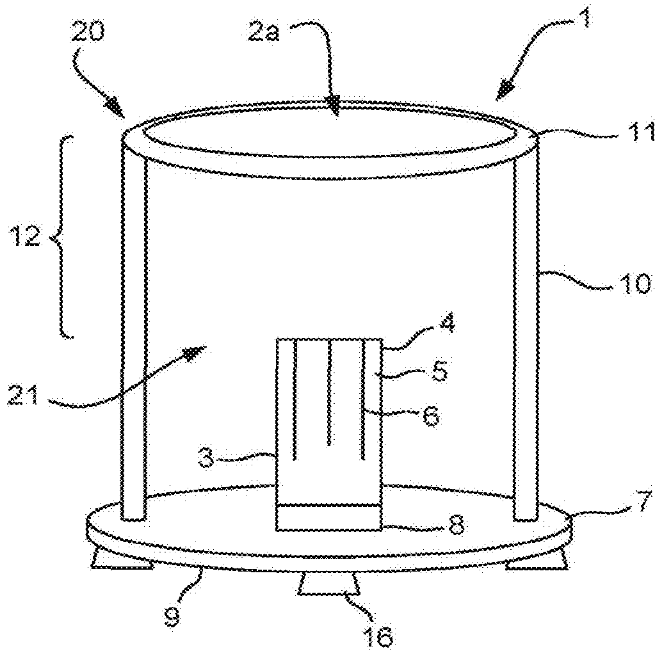
FIG. 1 is a front view of an embodiment of splitting apparatus, in accordance with one embodiment of the present invention.

With reference to the present invention by way of example only, there is provided improved splitting apparatus generally indicated by arrow 1, as illustrated in FIGS. 1 to 6.

The present invention is directed to improved splitting apparatus for use with splitting materials 2. The present invention is further directed in one embodiment, to the use of the apparatus for splitting wood 2 to produce kindling in coarse or fine form; and/or be adapted for use with other materials, including confectionery, ice, and so forth.

As can be seen in FIGS. 1 to 6, the splitting apparatus includes cutting means 3.

The cutting means is substantially as sharp as is determined necessary in order to be able to cut through or into the material being cut/split, or provide a face against which the material fractures and/or splits.

The cutting means includes at least one cutting surface. The cutting surface is at the upper distal edge of the cutting means, where the cutting means contacts the material.

The cutting surface may include at least one edge 4 and/or face 5 that contacts the material. The cutting surface may be tapered at 6 along that at least one edge and/or face.

The cutting surface edge and/or face are able to be sharpened. In other embodiments, the cutting means may have multiple sharpened edges or surfaces associated with multiple cutting surfaces or there may be multiple cutting means.

Figure 7:
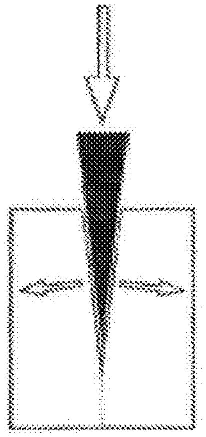
FIG. 7 is a cross-section of a splitting wedge with its length oriented vertically as applied in existing systems for splitting material, said cross section illustrating how a normally applied downward force produces forces perpendicular to its inclined surfaces.
Figure 2:
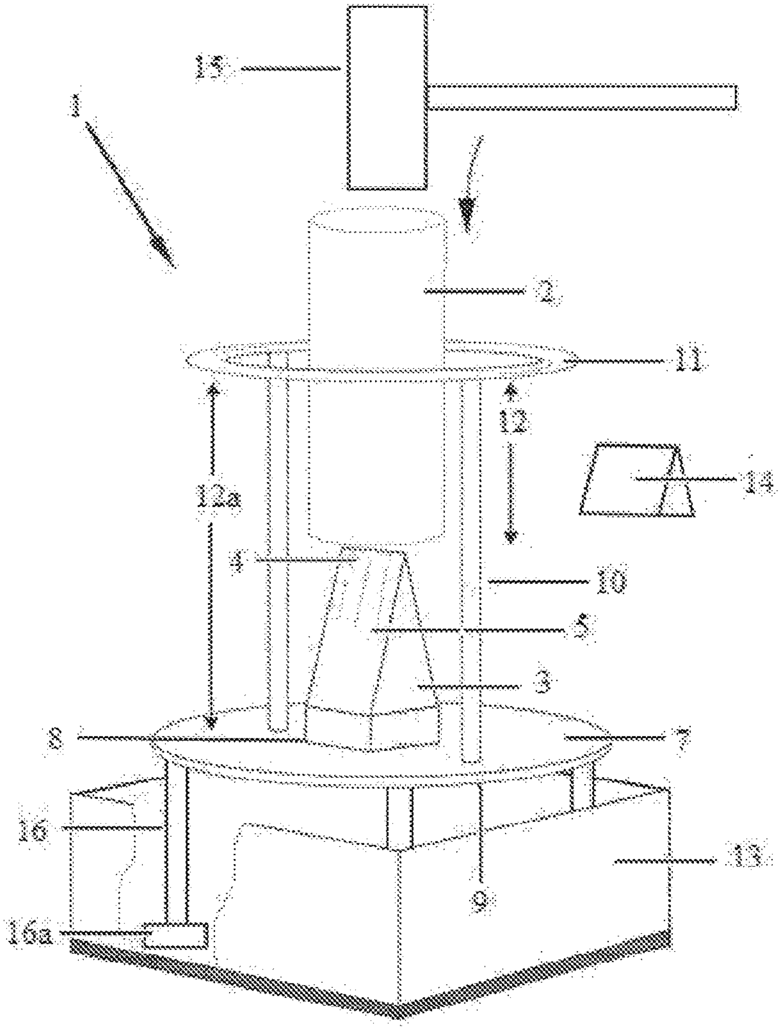
FIG. 2 is a perspective view of an embodiment of splitting apparatus, in accordance with one embodiment of the present invention.
Figure 3:
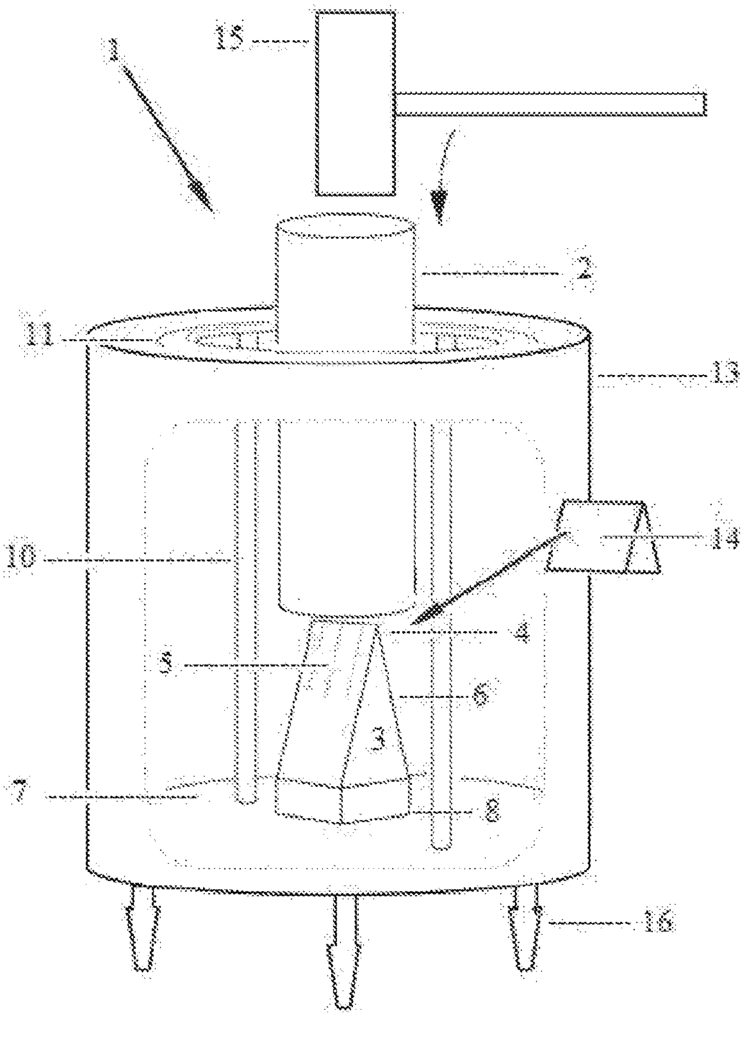
FIG. 3 is a diagrammatic representation of another embodiment of splitting apparatus, in accordance with one embodiment of the present invention.
Figure 4:
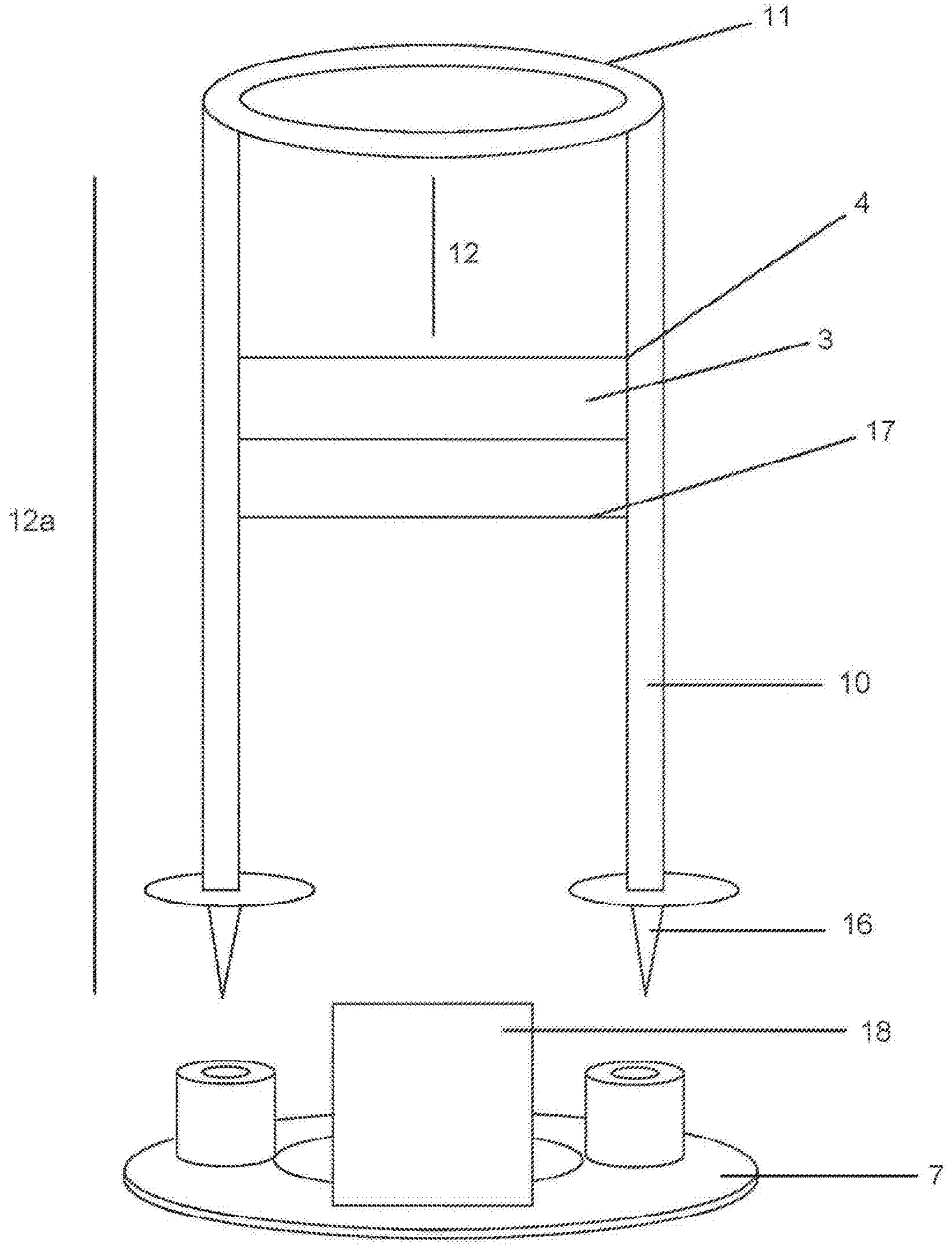
FIG. 4 is a diagrammatic representation of another embodiment of splitting apparatus, in accordance with another embodiment of the present invention.
Figure 5:
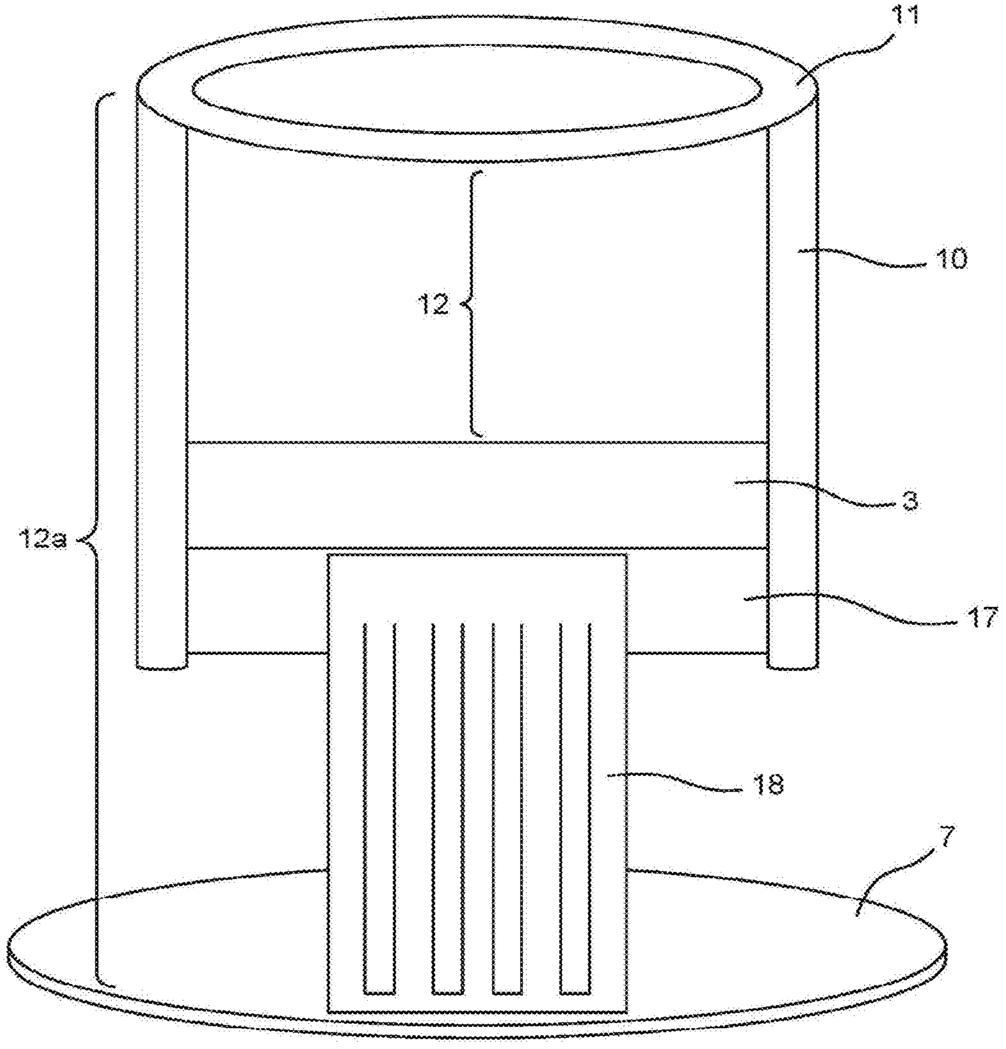
FIG. 5 is a diagrammatic representation of another embodiment of splitting apparatus, in accordance with another embodiment of the present invention.
Figure 6:
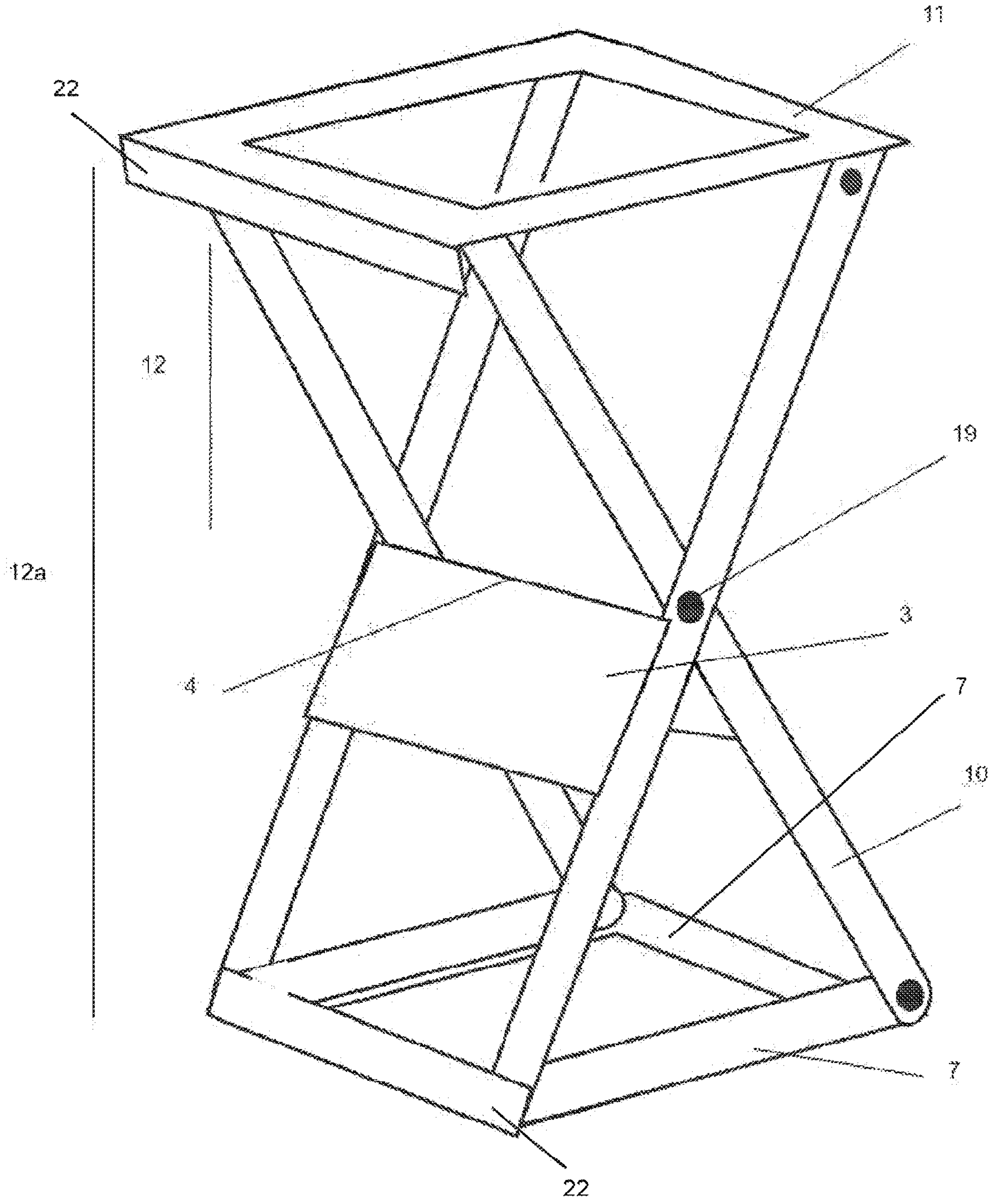
FIG. 6 is a diagrammatic representation of another embodiment of splitting apparatus, in accordance with one embodiment of the present invention.

In one embodiment of the present invention—where the splitting apparatus is used for splitting wood, the cutting means may be configured to complement the shape of an axe or tomahawk head as in FIGS. 1-3. FIG. 7 is a cross-section of a splitting wedge with its length oriented vertically as found in existing systems for splitting materials, said cross section illustrating how a normally applied downward force produces forces perpendicular to its inclined surfaces. The present invention achieves the same outcome but in a different way. The cutting means is fixed—it does not move and it is not part of any pressure means. However, in other embodiments, the cutting means may be similarly or otherwise configured as shown in FIGS. 4-6.

Preferably the cutting means is made from metal (steel/iron) such as a maul, tomahawk and an axe head. Although reinforced thermoplastics, stone, and so forth may be used for the cutting means depending on the hardness of the material to be split.

The splitting apparatus also includes a flat lower portion of the body 20 at 7—which operates as a base.

The cutting means is attached to the flat lower portion of the body in a secure manner at point 8, achieved via welding, or fixing with any suitable adhesive, or via permanent/removable fasteners such as screws/rivets. In this embodiment, in order to operate effectively, the cutting means is required to be rigidly held relative to the flat lower portion of the body/base, so that there is no potential for the cutting means to break, or for deflection of the cutting means off the material to be cut/split.

Where the cutting means is required to be sharpened, either a means is applied to sharpen it in situ, and/or the cutting means is removable for sharpening or replacement (if broken).

In other embodiments the cutting means may be inserted into or through an aperture in the face of the base and/or attached to the supporting means or otherwise located and secured via any means suitable. This is an alternative to an option that the cutting means be fitted onto another portion of the body or the base.

Figure 5A:
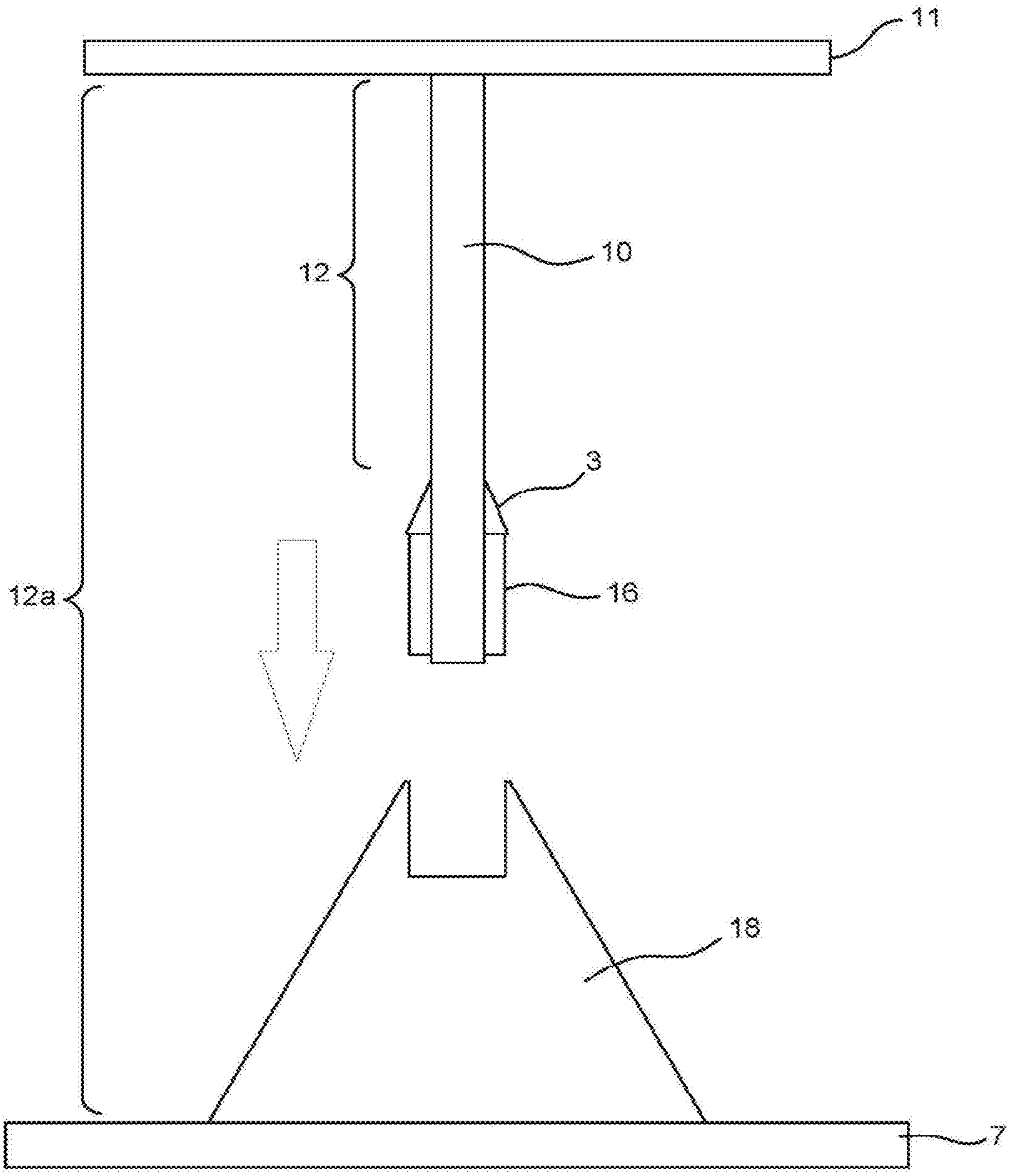
FIG. 5*a* is a diagrammatic representation of another embodiment of splitting apparatus, in accordance with another embodiment of the present invention.

As shown in FIGS. 4, 5 and 5*a* (at point 18) the cutting means may be assisted and/or supported by, but not limited to, multiple cutting means and/or assisted by a wedge, bump, fins or extrusion that is situated on or below the safety means, attached securely to the apparatus at any given placement by being welded, screwed, riveted, bolted, cast into the design or otherwise attached securely thereto. This is to aid the splitting action by forcing/splaying the material being used apart further than the blade alone would. The lump, bump, wedge or extrusion would be of equal width or wider than the widest part of the cutting means, it could be fashioned out of any shape such as a wedge shape, fins or solid block and made from any material such as but not limited to metal or plastic.

The cutting means is preferably connected/positioned relative to the centre of the base at 8, but it could be located elsewhere and fixed differently.

The body is configured to be circular, etc and be substantially adapted at the underside surface of its base 9 to sit substantially flat against a support surface (not shown) to allow for stability. However, the base of the body may be of any shape, including the provision of stabilising means 16, such as 'feet' attached to the underside surface of the base of the body to provide added stability if the body is not sitting true or flat against the surface, or as may be required for decorative purposes, as shown in FIG. 2.

The stabilising means 16 may alternatively include downwardly protruding spikes capable of being pushed into the ground to provide added support as shown in FIG. 3; or, for embodiments used in the food or medical industries, where bench-top models may be required, suction cups/systems may be fitted to the base to provide a firm grip and stability of the splitting apparatus, as illustrated in FIG. 1.

In other embodiments no stabilising means may be attached to the base of the splitting apparatus, particularly where the size and weight of the apparatus is sufficient to maintain it flat against a surface. In yet other versions, there may be no base used to stabilise the splitting apparatus, as shown in FIG. 4, the spikes at the end of the supporting means 16 may be elongated and used to provide support by, for example, being pushed into the ground or tree log to a depth sufficient to provide stability.

In yet other versions, there may be included wheels to facilitate movement of the splitting apparatus to improve the ease with which varyingly sized splitting apparatus may be moved from location to location where it is required to be used. Also, there may be some form of shock absorbing system included to aid in absorbing the shock/force generated when using the apparatus.

In addition to stability, the thickness of the base of the body is designed to provide secure attachment of the cutting means to the body in the desired location. The body, illustrated in the Figures, is made of metal (steel) material. If the cutting means is made from metal (like an axe head illustrated in the figures) then the body is best made from a metal plate that is a minimum of 6-8 mm thick to provide stability and secure fixing by welding to the cutting means and supporting means of the splitting apparatus.

The splitting apparatus also includes supporting means 10. The supporting means supports safety means 11 of the splitting apparatus.

Depending on the configuration of the cutting apparatus there may be multiple supporting means, or there can be a single supporting means. In FIGS. 1-3, there are two supporting means illustrated, but there may be more or less depending on the configuration. The number and location of the supporting means around the periphery of the body, depends on the material to be split.

The supporting means extends in a plane perpendicular from the plane of the base, and separates the base from the safety means by a preferred distance (shown at 12*a*), and to separate the safety means from the cutting means by a preferred distance (shown at 12).

Preferably the supporting means is made from metal (steel) because this can be securely welded to the body and safety means which gives optimum strength. The supporting means could however be made from any suitable material or combinations thereof—such as wood or reinforced plastic and so forth, in a version of the splitting apparatus that requires less strength—such as for some food products.

They supporting means are fixed to the base and the safety means by being welded, screwed/riveted or glued with an appropriate adhesive. They may be removable and of any length desired.

In addition to the supporting means, there may be additional bracing means to provide further rigidity to the cutting means and the supporting means (shown at 17)

The safety means 11 is configured to be round (circular), e.g., FIG. 4, but could be otherwise configured to be any other shape such as square, oblong, etc.

The safety means is located on the top of the supporting means to which it is welded or otherwise affixed/attached.

The safety means is made out of any suitable material such as metal (steel), but it could be made out of any other suitable materials or combinations thereof—including wood, thermoplastic materials (reinforced or otherwise), or rubber; particularly in variations that require less strength to be needed for the safety means.

The safety means is designed to prevent the user from injuring themselves on the exposed sharpened edge of the cutting means. The safety means may be coating with rubberized or softer thermoplastics material for added safety, of for aesthetic purposes. In addition, the safety means stops the material from easily moving outside of the safety means internal area.

Where the splitting apparatus is adapted to be used for preferred materials, including confectionery and/or ice, the entire splitting apparatus may be placed inside a receptacle (container means) 13 configured to accommodate the splitting apparatus and provide a means to prevent the material from scattering when split. After the splitting action has occurred, the splitting apparatus may be removed from the receptacle/container and the split material (such as with confectionery and/or ice) is retained in the container and is easily then transferred to another collection point.

The splitting apparatus also includes storage means 14 for use with the cutting means when the cutting apparatus is not in use.

The storage means operates as a cover for the sharp surface(s) of the cutting means, to help prevent damage to the cutting surface when the kindling cutter is not in use; or, to prevent injury to any person that could otherwise come in contact with the cutting surface(s).

The cover may be made out of any suitable hard or soft materials including leather, vinyl, plastic, metal and so forth.

Example 1

Method of assembling the splitting apparatus in one embodiment is achieved by the following steps:

a) From a substantially flat piece of the constructional material, cut out the body/base to a desired shape, size and thickness; and
b) Determine the cutting means to be used; and
c) Attach the cutting means to the centre of body; and
d) Cut supporting means to a desired length and attach relative to the base;
e) Prepare the safety means to a preferred size and shape to complement the base, or as may be required to accommodate the material to be split within a central aperture provided in the safety means; and
f) Position the safety means relative to the upper distal ends of the supporting means and secure in one or more locations; and
g) Engage optional stabilising means as required.

It is to be noted the stabilising means may be an extension of the length of the supporting means that extend beyond the base/body.

An alternative assembly option includes:

a) From a substantially flat piece of the constructional material, cut out the various flat sections of the supporting apparatus to the desired shape and size and thickness. This would include at least one of—safety means, base, stabilising apparatus, supporting apparatus and potentially container means (which may subsequently require bending/forming into preferred shape); and
b) Prepare the safety means to a preferred size and shape—whether to complement the base, or as may be required to accommodate and/or guide the material to be split within a central aperture provided in the safety means; and
c) Prepare the supporting means to a desired length and determine whether the supporting means is to be attached to a base, to extended stabilising means to project from around the supporting means, or whether the supporting means will be sharpened to include spiked outer distal ends and thus stand-alone; and
d) Position the safety means on to the upper distal ends of the supporting means and secure in one or more locations; and
e) Determine the cutting means to be used; and
f) Fix the cutting means in a position that will be substantially central to the final body; and
g) Fix the supporting means to the remaining relevant portions of the body (depending on the embodiment desired), such as a base, stabilising means, and/or cutting means by welding or otherwise affixing; and
h) Attach optional stabilising means and/or container means as required.

Example 2

In using the splitting apparatus, the following steps are followed:

a) Stabilise the splitting apparatus against a surface on which it is to be used; and
b) Place material you wish to split (in this case wood) down through the centre of the safety means (as shown at central opening 2*a* in FIG. 1) until it rests on top of the cutting means within an interior space 21 defined by the elongate supporting device in conjunction with the safety system (means) and the central opening; and c) Support the material, if required, with one hand so that it is in a substantially vertical arrangement and sits on top of the cutting means (which would be substantially centred on the base and in turn centered with respect to the safety means); and d) Holding pressure means in the other hand, tap gently but firmly on to the top of the material forcing the material downwards on to the cutting means, until the material splits (using as much force as may be required)

It is to be noted the process may be repeated several times to further split the pieces of material obtained from previous splitting actions, until they reach the desired thickness, number and so forth.

In order to split the material, a pressure means is required. The pressure means 15 in this case is a mallet. However any pressure means may be used, including a hammer, rock, log, sledge hammer and so forth may be used. The configuration of the present invention is such that less force and physical energy is required to be expended by the user in order to split the material. The pressure means is merely a means to drive the material on to the cutting edge of the cutting means.

The pressure required to be applied is substantially less than would be required if the user was wielding a maul, an axe or tomahawk to cut the wood, or as may be used in mechanical devices relying on electric or motorised hydraulic or pneumatic systems to apply the pressure.

While reference in the present description has referred to the cutting means being attached to the base, it should be appreciated that in other potential embodiments of the present invention the cutting means could instead be attached to at least two supporting means, yet still be oriented relative to, but distanced from, a base. This is exampled in FIG. 4 where, for one potential embodiment, the two supporting means are diametrically opposite each other. Further, in yet another option the cutting means could be connected to both the base and supporting means (not shown).

In any of the embodiments of the present invention there may be additional bracing (shown at 17) to provide further rigidity to the cutting means as exampled in FIG. 4-5.

Or, in yet another version as exampled in FIGS. 5 and 5*a*, the cutting means may be located at the base of the supporting means, the bottom edge of the cutting means sits securely inserted into a wedge, which is to assist with the splaying of the material and provides a stable slot for the cutting means to sit but could be fixed.

The wedge is fixed securely to the base by bolts/screws or welding etc or cast/molded as one piece. If the cutting means was effectively splaying the material the wedge could just be an extension of the base and be of any shape as long as it provides a stable support for the upper segment.

The supporting means still support the cutting means and safety means but are not attached and fixed directly to the base, to allow for easy removal.

This variation still allows the apparatus to be used in the same manner as other embodiments but allows it to be easily split into two parts. One reason for this, is so the top half can be removed and turned over to fit back over the bottom half which makes the unit more compact and protects the cutting means for sale, transportation or storage when not in use.

Also in this version the supporting means could be manufactured to continue under the cutting means to form a cross brace that the cutting means is attached to, this cross brace would be an extension of the supporting means and this would mean that the supporting means is still connected to the base by the extrusion 'wedge' that forms part of the base.

In another variation, exampled in FIG. 6, the supporting means may be configured as, but not limited to, an 'x' configuration with pivotal axis points (shown at 19) that allow for the splitting apparatus to be collapsible for storage and transportation. The pivoting points would most likely be located at the centre of the 'x' and if required at the points where the base and safety means attach to the supporting means. There would be locking tabs (shown at 22) to secure the splitting apparatus in the position to prevent collapse of the invention while in use.

When referring to the description of the present invention, it should also be understood that the term "comprise" where used herein is not to be considered to be used in a limiting sense. Accordingly, 'comprise' does not represent nor define an exclusive set of items, but includes the possibility of other components and items being added to the list.

This specification is also based on the understanding of the inventor regarding the prior art. The prior art description should not be regarded as being an authoritative disclosure of the true state of the prior art but rather as referring to considerations in and brought to the mind and attention of the inventor when developing this invention.

Aspects of the present invention have been described by way of example only and it should be appreciated that modifications and additions may be made thereto without departing from the scope thereof, as defined in the appended claims.

The invention claimed is:

1. A splitting apparatus for splitting hard material, said splitting apparatus comprising a vertically aligned free-standing body including stationary cutting means, said cutting means located in a central area of the body, the cutting means including at least one cutting surface, said cutting surface including at least one upward facing cutting edge, wherein the apparatus further comprises:

safety means to protect the user from injury from the cutting means and materials during splitting of the materials; and at least one elongate supporting means, having a top end and a bottom end; and wherein said safety means comprises a barrier between the user and the cutting means, wherein:

said safety means is configured to include and enclose a central aperture to either or both (i) accommodate and (ii) guide therewithin the material to be split, such that said the safety means surrounds the materials when the materials are inserted through the central aperture, the safety means being rigidly supported above the cutting surface of the cutting means by said elongate supporting means and being separated from the cutting edge of the cutting means;

said cutting edge is upwardly facing towards the safety means, and said cutting edge disposed a predetermined vertical distance from a surface on which the splitting apparatus is standing;

the safety means is affixed at the top end of said at least one elongate supporting means; and wherein said at least one elongate supporting means is of a predetermined length to vertically distance the safety means from the cutting edge and is positioned to allow adequate room around the cutting means so that the material being split does not jam between the cutting means and the supporting means;

the vertical distancing of said safety means from the cutting edge is predetermined to accommodate one or more of a length and a thickness of the material to facilitate splitting of the material and to enable the split material to fall free of the surrounding safety means; and the vertical distancing of said safety means from the cutting edge is predetermined to prevent injury to a user from contact with the cutting surface.

2. The splitting apparatus as claimed in claim 1, wherein the body includes a base, such that the at least one elongate supporting means is configured to (i) extend in a plane perpendicular to the base, (ii) distance the safety means at said predetermined vertical distance from the cutting surface of the cutting means, and (iii) distance the cutting surface of the cutting means at a predetermined vertical distance from the base.

3. The splitting apparatus as claimed in claim 2, wherein the base is adapted to stabilize splitting apparatus relative to a surface on which the splitting apparatus is used.

4. The splitting apparatus as claimed in claim 2, wherein either or both the base and the elongate supporting means include stabilizing means.

5. The splitting apparatus as claimed in claim 1, wherein the body includes stabilizing means.

6. The splitting apparatus as claimed in claim 1, wherein the safety means comprises a ring configured to be circular, square, or rectangular.

7. The splitting apparatus as claimed in claim 1, wherein the at least one elongate supporting means comprises at least two vertically extending supporting means.

8. The splitting apparatus as claimed in claim 1, wherein the at least one elongate supporting means comprises one of: (i) a single supporting means encircling around the body, (ii) multiple elongate supporting means located at set positions equally spaced around the body, and (iii) elongate supporting means configured as an "X" configuration.

9. The splitting apparatus as claimed in claim 1, wherein the splitting apparatus is adapted to be collapsible for at least one of storage, transport, and manufacturing purposes.

10. The splitting apparatus as claimed in claim 1, wherein the cutting means is disposed below the safety means.

11. The splitting apparatus as claimed in claim 1, wherein the at least one elongate supporting means is adapted to stabilize the splitting apparatus relative to a surface on which the splitting apparatus is used.

* * * * *